(12) United States Patent
Combes et al.

(10) Patent No.: US 8,146,856 B2
(45) Date of Patent: Apr. 3, 2012

(54) DEVICE FOR ATTACHING AN AIRCRAFT ENGINE AND AIRCRAFT COMPRISING AT LEAST ONE SUCH DEVICE

(75) Inventors: Stephane Combes, Buzet sur Tarn (FR); Didier Rovatti, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 298 days.

(21) Appl. No.: 12/596,555

(22) PCT Filed: Apr. 18, 2008

(86) PCT No.: PCT/EP2008/054743
§ 371 (c)(1), (2), (4) Date: Oct. 19, 2009

(87) PCT Pub. No.: WO2008/135366
PCT Pub. Date: Nov. 13, 2008

(65) Prior Publication Data
US 2010/0127118 A1    May 27, 2010

(30) Foreign Application Priority Data
Apr. 20, 2007   (FR) ...................................... 07 54618

(51) Int. Cl.
*B64D 27/00* (2006.01)
(52) U.S. Cl. .............................. 244/54; 60/797; 248/554
(58) Field of Classification Search .................... 244/54; 248/554–557; 60/796–797
See application file for complete search history.

(56) References Cited

U.S. PATENT DOCUMENTS

| | | | | |
|---|---|---|---|---|
| 3,844,115 A | * | 10/1974 | Freid | ............................... 60/797 |
| 4,065,077 A | * | 12/1977 | Brooks | ............................ 244/54 |
| 5,320,307 A | * | 6/1994 | Spofford et al. | ................. 244/54 |
| 5,871,175 A | * | 2/1999 | Demouzon et al. | ............. 244/54 |
| 5,871,177 A | * | 2/1999 | Demouzon et al. | ............. 244/54 |
| 6,296,203 B1 | * | 10/2001 | Manteiga et al. | ............... 244/54 |
| 7,607,609 B2 | | 10/2009 | Levert | |
| 2004/0135029 A1 | * | 7/2004 | Bansemir et al. | ............... 244/54 |
| 2005/0082423 A1 | * | 4/2005 | Whitmer et al. | ................ 244/54 |

FOREIGN PATENT DOCUMENTS

| | | |
|---|---|---|
| EP | 0 564 126 A1 | 10/1993 |
| FR | 2 217 549 | 9/1974 |
| GB | 2 010 969 A | 7/1979 |

OTHER PUBLICATIONS

U.S. Appl. No. 13/078,593, filed Apr. 1, 2011, Combes, et al.
U.S. Appl. No. 12/594,455, filed Oct. 2, 2009, Combes, et al.
U.S. Appl. No. 12/664,256, filed Dec. 11, 2009, Combes, et al.

* cited by examiner

*Primary Examiner* — Joshua Michener
*Assistant Examiner* — Medhat Badawi
(74) *Attorney, Agent, or Firm* — Oblon, Spivak, McClelland, Maier & Neustadt, L.L.P.

(57) ABSTRACT

An attachment device for an aircraft engine that includes a rigid structure and an attachment mechanism of the engine to the rigid structure. The attachment mechanism includes a device reacting to thrust forces generated by the engine, the reacting device including two link rods mechanically connected to a balance beam at a rear end by a first mechanical connection, a main fitting fixed to the rigid structure to which the balance beam is mechanically connected, and two additional fittings fixed to the rigid structure to which the link rods are mechanically connected with play. The mechanical connections between the balance beam and the main fitting and between the link rods and the additional fittings each include a pin orthogonal to a mid-plane of transmission of the forces.

9 Claims, 4 Drawing Sheets

DEVICE FOR ATTACHING AN AIRCRAFT ENGINE AND AIRCRAFT COMPRISING AT LEAST ONE SUCH DEVICE

TECHNICAL FIELD AND PRIOR ART

The present invention relates in a general manner to a device for attaching an aircraft engine, for example designed to be interposed between an aircraft wing and the engine involved, as well as to an engine assembly which includes such an attachment device.

The invention may be used on any type of aircraft fitted with, for example, turbojet or turboprop engines.

This type of attachment device, also known as a mounting pylon or "EMS" ("Engine Mounting Structure"), may be used to suspend an engine beneath the wing of an aircraft, to mount said engine above the same said wing or even to attach said engine to the rear part of the aircraft's fuselage.

Such an attachment device is in effect envisaged as forming a connecting interface between a turbojet engine and an aircraft's wing. It allows the forces generated by its associated turbojet engine to be transferred to the structure of this aircraft and also allows fuel, electrical, hydraulic and air systems to be routed between the engine and the aircraft.

In order to allow forces to be transmitted, the attachment device is comprised of a rigid structure, also known as the primary structure, often a "box-type" structure; that is, one formed of an assembly of upper and lower spars and of lateral panels connected together by means of transverse ribs.

On the other hand, the device is equipped with means of attachment interposed between the turbojet engine and the rigid structure, where these means include, overall, two engine attachment members as well as a device for reacting to the thrust forces generated by the turbojet engine.

In the prior art, this load reacting device includes, for example, two lateral link rods which are connected on the one hand to the turbojet engine's fan casing and on the other hand to a balance beam, itself mounted so that it pivots on the rigid structure of the attachment device.

Similarly, the attachment device also includes another series of attachment members which form a mounting system interposed between the rigid structure and the wing of the aircraft, where this system is usually made up of two or three attachment members.

Finally, the pylon is equipped with a secondary structure which separates and holds the systems whilst supporting aerodynamic fairings.

As has been described above, the solutions proposed previously envisage that the device for reacting to the thrust forces incorporates a balance beam mounted so that it pivots on the rigid structure, by means of a connecting pin. In this respect, it is stated that in order to ensure a so-called "Fail Safe" function for the transmission of forces along the longitudinal direction, the balance beam is usually made using two superimposed fittings, so that the connecting pin itself is in the form of a double pin. Thus in the event of one of the two superimposed fittings which make up the balance beam breaking, the other will provide reaction to the forces coming from the lateral link rods on its own, and in the event of the external pin of the doubled connecting pin breaking, the internal pin then takes over in order to provide reaction and transmits these said forces along the longitudinal direction.

Attachment devices are known in which the rear attachment member and the load reacting devices are distinct and are longitudinally offset. Attachment of the engine to the lower spar of the box structure is achieved by means of a pin which is firmly fixed to the engine and which passes through the spar. This pin is usually inclined in relation to the vertical. This inclination makes for complex assembly and requires that specific tooling be used in order to allow such fixing to be carried out.

Furthermore, some aircraft engines have external diameters that are relatively large in relation to conventional engine diameters, which means that the engine must be brought as close as possible to the wing in order to reduce ground clearance impacts. The closeness then limits the possibilities for using special tools.

Consequently it is an objective of the present invention to provide an attachment device which includes a load reacting device which allows simple assembly of the engine close to the box structure.

PRESENTATION OF THE INVENTION

The objective stated above is achieved by an engine attachment device for an aircraft comprising a device for reacting to the thrust forces which includes a part fixed to the box structure and a part which is fixed to the engine, where the mechanical connection between the first and second parts is achieved by means of lateral pinning relative to the load reacting mid-plane.

The load reacting device includes two load reacting link rods which are mechanically connected to a balance beam. For example, the balance beam is mechanically linked to an intermediate balance beam fitting, and each link rod is mechanically linked to a link rod intermediate fitting. The balance beam intermediate fitting is mechanically linked to a main fitting which is fixed to the box structure using a pin which is fitted laterally in relation to the load reacting pin, and the link rod intermediate fittings are mechanically connected to additional fittings fixed onto the box structure by means of pins mounted laterally in relation to the load reacting pin.

The lateral mounting of the pins avoids the need to use specific tooling is avoided. In addition, the present invention allows hoisting of the engine including the link rods and balance beam using vertical movement. Furthermore, the principal fitting and additional fittings locate inside the respective fittings which are fixed to the box structure. Thus the engine may be fitted as close as possible to the box structure and therefore to the wing.

The assembly according to the present invention therefore includes, in particular, steps involving:
- hoisting of the engine
- alignment of the balance beam intermediate fitting and of the main fitting and of the link rod intermediate fittings and of the additional fittings,
- inserting the mechanical connection parts laterally in relation to the load reacting mid-plane.

The subject-matter of the present invention is therefore an attachment device for an aircraft engine which includes a rigid structure and means of attachment of said engine on said rigid structure, where said means of attachment include a load reacting device for the thrust forces generated by the engine, where said load reacting device includes two link rods which are mechanically connected to a balance beam at a rear end by a first mechanical connection, a main fitting which is fixed on the rigid structure to which the balance beam is mechanically connected, two additional fittings fixed on the rigid structure and to which the link rods are mechanically connected with play, in which the mechanical connections between the balance beam and the main fitting and between the link rods and the additional fittings each include a pin which is orthogonal to the mid plane of transmission of the forces, where the pin of each of the mechanical connections is the insertion pin of each of said mechanical connections.

In a preferred example, the load reacting device includes an intermediate balance beam fitting which mechanically links the balance beam to the main fitting, where the pin which is orthogonal to the mid-plane of transmission of the forces passes through the intermediate fitting of the balance beam, and two link rod intermediate fittings, each mechanically linking the link rods to the additional fittings, where the pins which are orthogonal to the force transmission mid-plane passes through the link rod intermediate fittings.

In one specific example, the intermediate fittings include forks which hold parts which protrude from the main and additional fittings, where the pins are introduced into bores made in the forks and the protruding parts.

The play in the mechanical connection between the link rods and the additional fittings is made at the connection between the rear ends of the link rods and the link rod intermediate fittings.

Each link rod is advantageously mechanically linked to the balance beam by a pin and each link rod is mechanically linked to a link rod intermediate fitting by the same pin. The device therefore has small overall dimensions, as well a low mass.

For example, the additional forks are fixed on the rigid structure forwards of the main fitting.

The balance beam may be linked to the balance beam intermediate fitting by a pin which is orthogonal to the pin between the balance beam intermediate fitting and the main fitting.

The main fitting and the additional fittings are, for example, fixed using fishplates onto the rigid structure.

The balance beam advantageously comprises two superimposed balance beams and the pins advantageously comprise an internal pin and an external pin in order to improve the safety of the device.

Advantageously, the balance beam intermediate fitting is kept clamped on the main fitting and/or each link rod intermediate fitting is kept clamped on the additional fitting to which it is mechanically connected.

The balance beam intermediate fitting includes, for example, two lateral fins which hold a tension bolt which is screwed into a clamp nut fitting on the main fitting. This tightened assembly means that the instability in the mounting of the balance beam intermediate fitting on the main fitting can be removed.

Each link rod intermediate fitting is advantageously kept clamped on the corresponding additional fitting by means of a draw nut which passes through the link rod intermediate fitting and screws into the additional fitting. This means that the instability in the mounting of the link rod intermediate fitting on the additional fitting can be removed.

The attachment device according to the present invention may include a forward engine attachment member and a rear engine attachment member, where the load reacting device is advantageously arranged forward of the rear engine attachment member.

The present invention also has as a subject an engine assembly which includes an engine and a device for attaching the engine, characterised by the fact that said attachment device is a device according to the present invention.

The present invention also has as a subject an aircraft comprising at least one engine assembly according to the present invention, assembled onto a wing or onto a rear part of the fuselage of this aircraft.

The subject-matter of the present invention is also a method for mounting an aircraft engine with an attachment device according to the present invention which includes steps for:

a) vertical hoisting of the engine towards the rigid structure, b) alignment of the fittings fixed to the rigid structure and of the fittings firmly attached to the engine, c) the realisation of mechanical connections between the fittings fixed to the rigid structure and the fittings which are mechanically connected to the engine by lateral pinning of the fittings.

The method according to the invention may also include a step for fixing the engine to these forward and rear engine attachment members, with this taking place before or after steps a) to c).

BRIEF DESCRIPTION OF THE DRAWINGS

The present invention will be more clearly understood using the following description and the appended drawings, in which.

DETAILED DESCRIPTION OF SPECIFIC EMBODIMENTS

Figure 1:
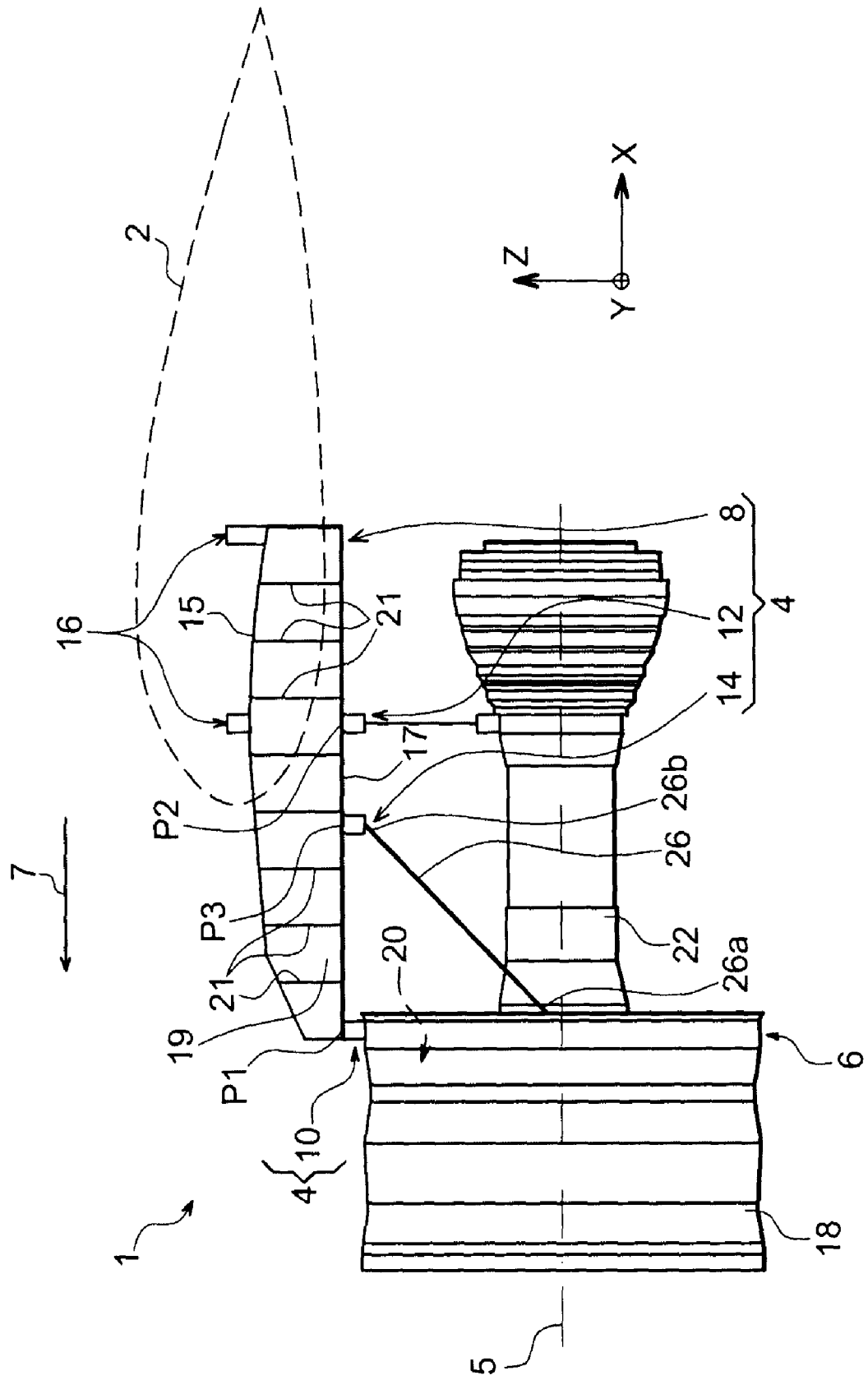
FIG. 1 represents a general schematic side view of an engine assembly for an aircraft, which includes a pylon mounting structure.

With reference to FIG. 1, an aircraft engine assembly 1 is shown which is intended to be fixed beneath a wing 2 of same aircraft, represented only schematically in dotted lines for the sake of clarity, where this assembly 1 includes an attachment device 4 together with an engine 6 such as a turbojet engine attached beneath this device 4.

Overall the attachment device 4 includes a rigid structure 8 which carries means for attachment of the engine 6, where these means of attachment are equipped with multiple engine attachment members 10, 12, as well as a thrust force take-up device 14 for thrust generated by the engine.

For information, it should be noted that the assembly 1 is designed to be surrounded by a nacelle (not shown) and that the attachment device 4 includes another series of attachment members 16 which are used to suspend this assembly 1 beneath the aircraft's wings.

Throughout the description which follows, by convention X is the reference for the longitudinal direction of the device 4 which is also the same as the longitudinal direction of the turbojet engine 6, where this direction X is parallel to a longitudinal axis 5 of this turbojet engine 6 and of that of the device 14. On the other hand, Y is the reference for to the direction transversely orientated in relation to the device 4 and which is the same as the transverse direction of the turbojet 6 and that of the device 14, and Z is the vertical direction or height, where these three directions X, Y, Z are orthogonal to each other.

In addition, the terms "front" and "rear" are to be considered in relation to the direction of forward motion of the aircraft experienced as a result of the thrust exerted by the turbojet engine 6, with this direction being schematically represented by the arrow 7.

In FIG. 1 the two engine attachment members 10, 12, the series of attachment members 16, the thrust force take-up device 14 and the rigid structure 8 of the attachment device 4 can be seen. The other constituent elements of this device 4 that are not shown, such as the secondary structure which separates and holds the systems whilst supporting the aerodynamic fairings, are conventional components which are the same as or similar to those encountered in the prior art, and known to the one having ordinary skilled in the art. There will consequently be no detailed description of these.

On the other hand it is stated that the turbojet 6 is equipped at its front with a fan casing 18 of large dimensions, which surrounds an annular fan case duct 20, and includes towards the rear a central casing 22 of smaller dimensions, which encloses the centre of said turbojet engine. The casings 18 and 20 are, of course, firmly attached to each other.

As may be seen in FIG. 1, there are two engine attachment members 10, 12 provided for the device 4, which are respectively referred to as the front engine attachment member and rear engine attachment member.

In this example of an embodiment, the rigid structure 8 takes the form of a box structure which extends forwards from the rear, approximately along the direction X.

The box section 8 therefore takes the form of a pylon with a design similar to that usually observed for turbojet engine pylon mounting structures, in particular in that it is made by the assembly of an upper spar 15, a lower spar 17 and two lateral spars/panels 19 (only one can be seen because of the side view), where these elements 15, 17 19 are connected together by transverse ribs 21 which each take the overall form of a rectangle. Thus the ribs 21 extend in the YZ planes, the spars 15, 17 extend roughly in the XY planes and the lateral panels 19 in the XZ planes.

The means of attachment include first of all the front engine attachment member 10, interposed between a front end of the rigid structure 8 also known as the pyramid, and an upper part of the fan housing 18. It would nevertheless be possible to envisage the front engine attachment member 10 being fixed onto a connecting housing between the central housing and the fan housing, as is known to the one having ordinary skilled in the art. The front engine attachment member 10, of a conventional design known to those working in this field, is fixed to a first point P1 of the rigid structure 8, with the latter also being referred to as the primary structure.

On the other hand, the rear motor attachment member 12, also made in a conventional manner familiar to those working in the field, is in turn interposed between the rigid structure 8 and the central housing 22, and fixed at a second point P2 of the rigid structure 8 located towards the rear in relation to the point P1. In the example shown, the thrust force take-up device 14 is fixed to the box structure at a third point P3, located between the first point P1 and the second point P2.

Figure 2:
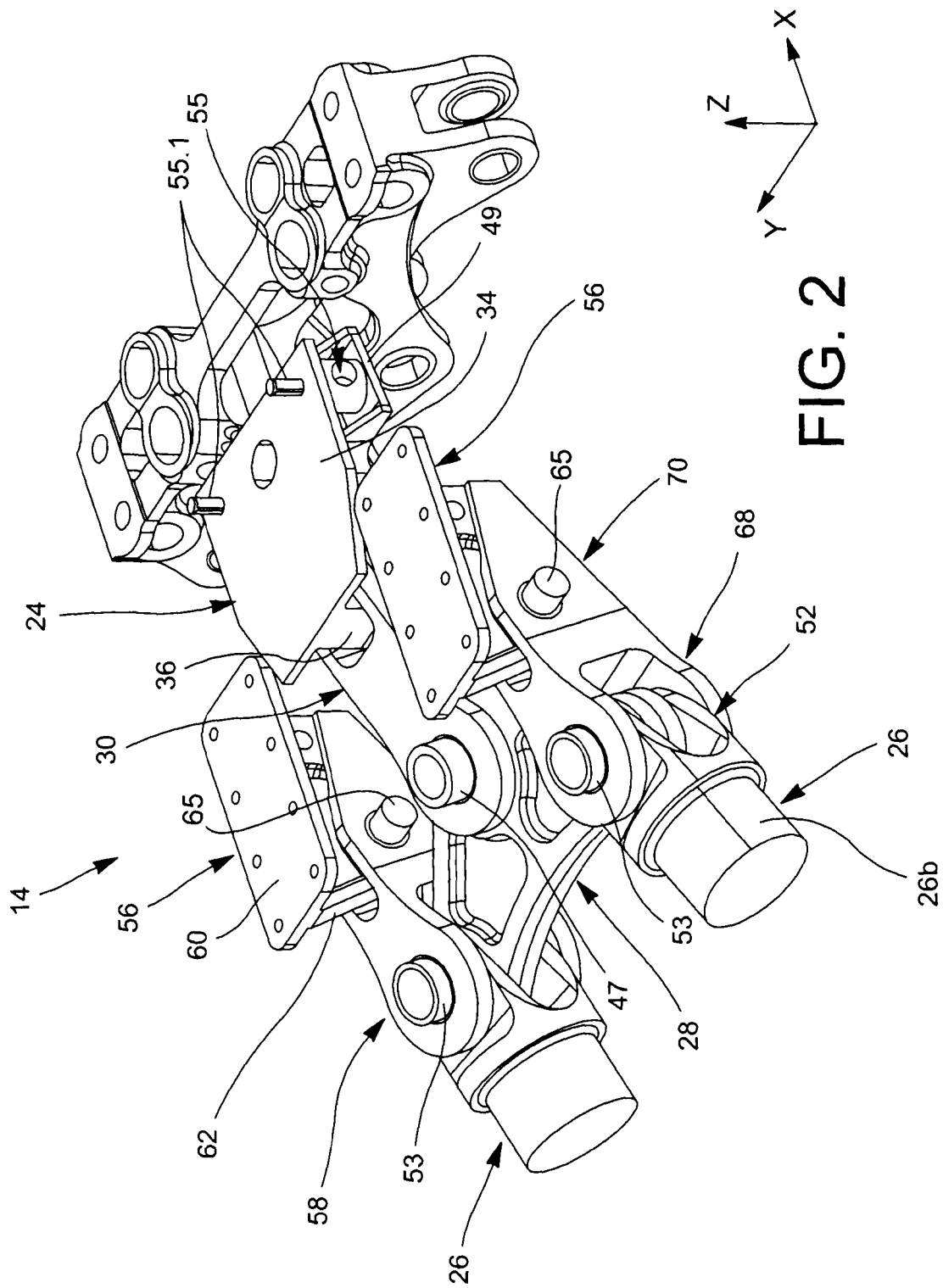
FIG. 2 is a perspective view from above of a device for reacting to the thrust forces according to the present invention.
Figure 3A:
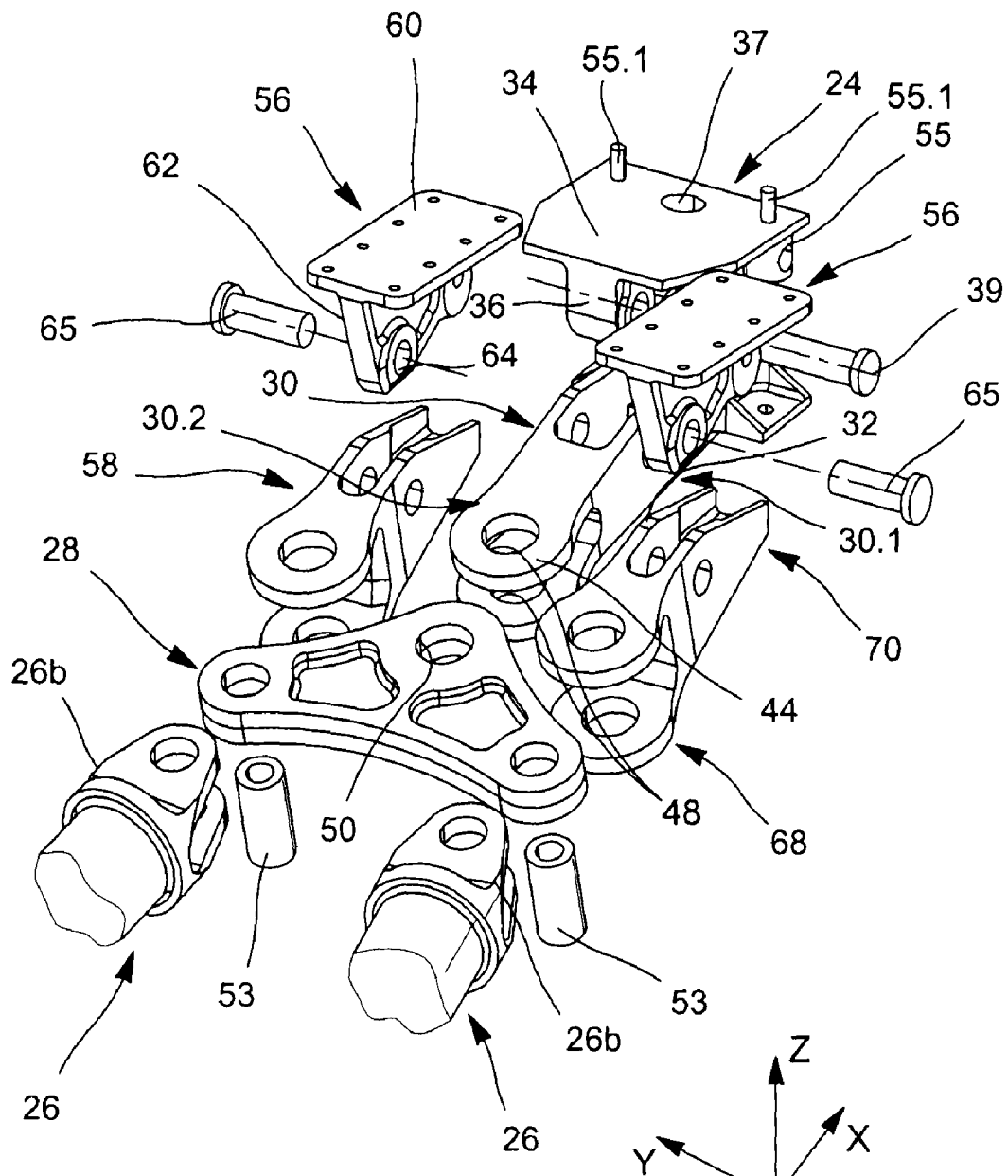
FIG. 3A is an exploded view of FIG. 2.
Figure 3B:
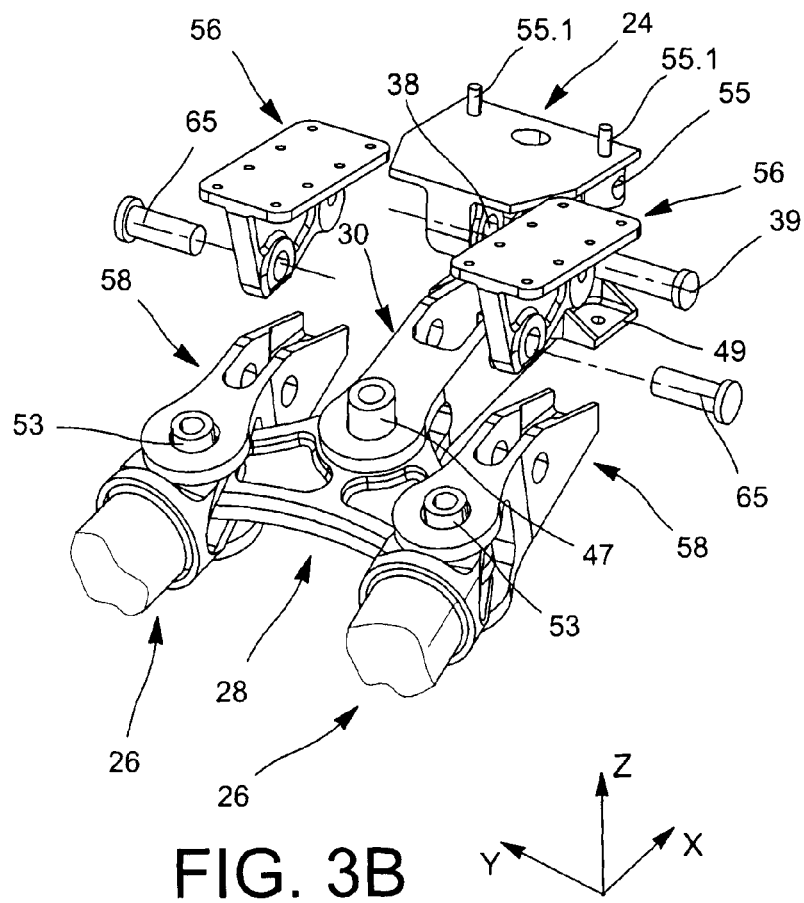
FIG. 3B is a view of the device in FIG. 2, partly assembled.

The load reacting device 14 represented in FIGS. 2, 3A and 3B includes a main fitting 24 which is fixed to a lower face of the box structure, in particular to the lower spar 17. This fitting 24 is intended to allow mechanical fixing of the load reacting link rods 26 through a balance beam 28 to the box structure 8.

In the example shown, the device includes a single balance beam, with the balance beam fail-safe function being provided by the additional fittings 56, which will be described in the description which follows.

However, the use of a double balance beam as in current practice could be envisaged.

For example, the main fitting 24 is fixed by means of fish plates onto the lower spar 17.

In the present request, the term load reacting mid-plane or mid-plane of transmission of the forces refers to the plane of symmetry of the load reacting device which extends horizontally and vertically.

In the example shown, the main fitting 24 includes a base 34 fixed to the lower spar 17, for example by means of fish-plates, and a part 36 protruding from this base 34 approximately orthogonal to it, where said part 36 is contained in a plane which is parallel to the mid-plane of transmission of the forces and which includes a bore 38 which is orthogonal to said plane. This bore 38 holds a connecting pin 39.

The base 36 also includes a bore 37 for a traction pin 37 (not shown) to pass through, which is intended to transmit forces from the main fitting 24 to the box structure 8. The traction pin is located in the load reacting mid-plane.

In one example of realisation of the present invention, the device also includes a balance beam intermediate fitting 30 which mechanically links the balance beam 28 to the main fitting 24.

The balance beam intermediate fitting 30 includes, at a first rear end 30.1, a fork 32 both branches of which are approximately vertical and hold the protruding part 36 of the main fitting 24.

Each branch of the fork 32 includes a bore (not shown) intended to face the bore 38 in the part 36 so as to mount the pin 39 orthogonally to the part 36 and to the fork 32.

The balance beam intermediate fitting 30 includes at a second forward end 30.2 another fork 44 which holds the balance beam 28.

The mechanical connection between the balance beam intermediate fitting 30 and the balance beam 28 is made using a pin 47 (shown in FIG. 3B) fitted in the bores 48 made in the branches of the fork 44 and in the bore 50 made in the balance beam 28.

This assembly can render the intermediate fitting 30 unstable, since it is possible for it to rotate around the pinning pin 47. It is therefore advantageous, in order to overcome this risk of instability, to envisage that the intermediate fitting 24 is held clamped on the main fitting 24.

Figure 4:
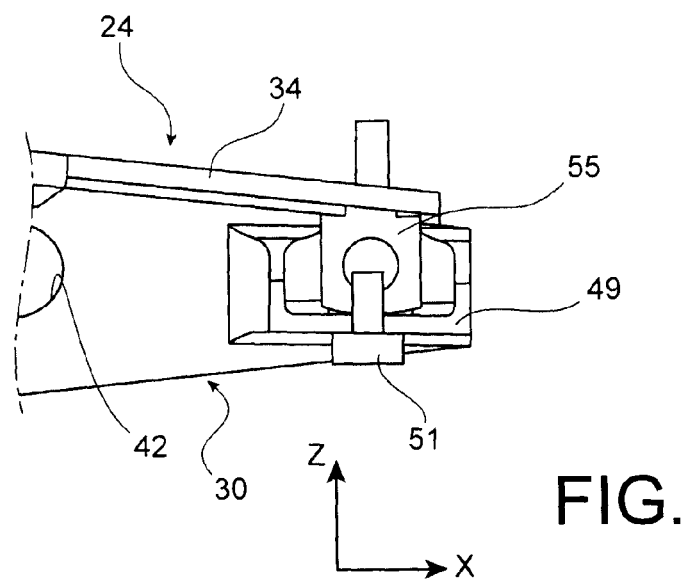
FIG. 4 is a detail side view of the load reacting device in FIG. 2, where it is fixed to the box section.

In order to achieve this, the intermediate fitting includes, in the example shown, two fins 49 which extend laterally and orthogonally in relation to the median plane. Each of these fins include a bore for a tension bolt 51 to pass through, which screws into a barrel nut 55 which is firmly fixed to the main fitting 24, as can be seen in FIG. 4.

In the example shown, the base 34 is fixed to the box structure 8 by means of the ends 55.1 of barrel nuts and by two other tension bolts (not shown).

In the example shown, the fork 32 and the fork 44 of the intermediate fitting are aligned at 90° to each other around the X axis.

The link rods 26 are mechanically connected in a symmetric manner to the balance beam on either side of the mid-plane of transmission of the forces.

Each link rod 26 includes, at a rear longitudinal end 26b, a fork 52 fitted so that is it free to rotate on a lateral end of the balance beam 28 by a pin 53.

In the example shown, the pin which connects the balance beam 28 to the intermediate fitting 30 of the balance beam and the pin which connects the link rods 26 to the balance beam 28 are parallel.

According to the present invention, a mechanical link between each link rod 26 and an additional fitting 56 which is fixed to the lower spar 17 is also envisaged. This mechanical link includes play, so that it is not stressed in normal operation i.e. when none of the link rods, balance beam or mechanical connections are damaged.

This mechanical connection is made using a link rod intermediate fitting 58 which links the rear end 26b of the link rod 26 to the additional fitting 56.

In the example shown, the additional fitting 56 includes a base 60 for fixing to the lower spar 17, which is advantageously in contact with the lower spar 17, and a part 62 which protrudes perpendicularly to this base 60 and in parallel with the mid-plane of transmission of the forces and the protruding part 36 of the main fitting 24. The base 60 is for example fixed by means of fish plates to the lower spar 17, for example by means of 8 tension bolts (not shown); only the bores made in the base are shown.

These tension bolts also form shear bolts, which transmit thrust forces to the box structure 8 in fail-safe mode.

This protruding part 62 includes a bore 64 for a pin 65 to pass through.

The link rod intermediate fitting 58 includes a first fork 68 at a forward end and a second fork 70 at a rear end.

According to the present invention, the second fork 70 includes branches which are approximately vertical which hold the protruding part 62 of the additional fitting 56.

Advantageously, in order to remove the instability of the link rod intermediate fitting 58 around its pin 65, it is envisaged that the link rod intermediate fitting 58 is held clamped on the additional fitting, in a similar way to the link rod intermediate fitting 30. This clamp hold is achieved by means of a tension bolt which is approximately vertical fitted in a bore made in a wall, (not shown) which links the two branches or the first fork 68 and which screws into the protruding part 62 of the additional fitting 56, with the additional fitting 56 acting as a barrel nut.

The link rod intermediate fitting 58 and the additional fitting 56 are mechanically linked by the laterally inserted pin 65.

In the example shown, the first fork 68 is aligned at 90° in relation to the second fork 70.

The link rod intermediate fitting 58 is linked to the link rod 26 by the pin 53. Advantageously, the pins connecting the link rod 26 to the balance beam 28 and the link rod 26 to the link rod intermediate fitting 58 are one and the same, thus allowing assembly to be simplified and the total mass of the attachment device to be reduced.

However, these two pins could be envisaged as being distinct, for example with the pin connecting the link rod 26 to the link rod intermediate fitting 58 being behind the pin 53 which connects the link rod 26 to the balance beam 28.

There is play at the pin 53 between each link rod 26 and the corresponding link rod intermediate fitting 58.

In a preferred example of realisation, all pins are doubled i.e. they each comprise an internal pin and an external pin; in the event of the external pin breaking the forces are transmitted by the internal pin. Since this type of pin is well known to those working in this field, it will not be described in further detail.

In the example shown, the additional fittings 56 are arranged laterally forward of the main fitting 24. The main fitting 24 however can be located forward of the additional fittings 56, depending on the position of the lower spar 17 of the box structure.

According to the present invention, the balance beam intermediate fitting 30 forks and link rod intermediate fitting 58 forks are parallel so as to allow fitting by means of vertical movement of the engine equipped with intermediate fittings 30, 58, with these then surrounding the main fittings 24 and additional fittings 56.

We will now describe the path taken by forces from the link rods 26 towards the box structure 8 in the various states of the elements of the load reacting device.

When the load reacting device 14 according to the invention is in a normal state, i.e. when no parts are damaged, the loads on the link rods 26 are transmitted to the balance beam 28 by the pins 53, then to the balance beam intermediate fitting 30 by the pin 47, then to the main fitting 24 by the pin 39. The forces then finally act on the box structure 8 to which the main fitting 24 is fixed by means of the traction pin.

In the event of a link rod 26 breaking, the balance beam 28 is no longer in a balanced position in relation to the pin, the pin for the intact link rod 26 comes into contact with the edge of the bore in the link rod intermediate fitting 58, and the rotation of the balance beam is then stopped. The forces from the intact link rod 26 are transmitted to the balance beam 28 and to the link rod intermediate fitting 58, which respectively transmit forces to the main fitting 24 and to the additional fitting 56. The forces are then transmitted to the box structure 8 by the tension bolts which fix the additional fittings to the box structure 8.

In the event of the balance beam 28 breaking, both link rods 26 transmit the thrust forces directly to the additional fittings 56, 58, which transmit them to the box structure 8. In this event there is no stress placed upon the intermediate fitting 30 and the main fitting.

Thus the load reacting device according to the present invention provides a so-called fail-safe function, whilst allowing the engine to be easily mounted on the box structure.

We will now describe the method for mounting the engine on the box structure, more specifically mounting at the load reacting device.

The main fitting 24 and the additional fittings 56 are fixed beforehand onto the box structure 8, in particular to the lower spar 17, the main fitting 24 is arranged on the load reacting mid-plane and the additional fittings 56 are arranged on either side of the main fitting 24, and axially offset forward of the latter, with the pins of the bores in the main fittings and additional fittings 56 being approximately parallel.

The load reacting link rods 26 are fixed at a forward end 26a to the engine, in particular to the fan housing and are connected at their rear end 26b to the balance beam 28 and to the link rod intermediate fittings 58, with the balance beam 28 itself being mechanically connected to the balance beam intermediate fitting 30.

The steps in the mounting of the engine on the box structure 8 are as follows:

hoisting of the engine towards the balance beam 28,

Alignment of the balance beam intermediate fitting 30 with the main fitting 24 and the alignment of the link rod intermediate fittings 58 with the additional fittings 56, lateral insertion of a mechanical connection element between the balance beam intermediate fitting 30 and the main fitting 24, and of a mechanical connection element between each of the link rod intermediate fittings 58 with an additional fitting 56, in order to make mechanical connections.

The tension bolts are put in place after the lateral pins are put in place.

Before or after these steps, the engine is fixed to the rear engine attachment member 12 and to the forward engine attachment member 10.

Mounting is therefore simple and requires no specific tools, since the fitting of these connection elements is carried out from the side and not from above as in current practice.

This assembly of the load reacting device from the side means that the space required between the box structure and the engine is reduced, with it then being possible to bring it closer to the engine. Thus the use of larger diameter engines still allows ground clearance impacts to be reduced, as is the case with the use of engines of smaller diameters which include load reacting devices found in current practice.

The load reacting device represented in FIGS. 2 to 3 has been described by way of an example only and is not restrictive. Modifications may be made without departing from the context of the invention. For example, the mechanical connections between the link rods, the balance beam and the link rod intermediate fittings may be achieved in a different manner. In particular it could be envisaged that the fork at the rear end each link rod is fitted inside the fork of the link rod intermediate fitting. In addition, it could be envisaged that the forks are carried by fittings fixed to the lower spar, with the intermediate fittings then being fitted into these forks.

One could also envisage that the main fitting 24 and the additional fittings 56 form a single piece which facilitates fixing to the box structure 8.

The invention claimed is:

1. An attachment device for an aircraft engine comprising:
a rigid structure; and
means for attachment of the engine to the rigid structure, said means for attachment including a load reacting device for thrust generated by the engine, the load reacting device including two link rods mechanically connected to a balance beam at a rear that is fixed to the rigid structure to which the balance beam is mechanically connected, two additional fittings fixed to the rigid structure to which the link rods are mechanically connected with play, in which mechanical connections between the balance beam and a main fitting and between tile link rods and the additional fittings each include a pin orthogonal to a force transmission mid-plane, and the pin for each of the mechanical connections is an insertion pin for each of said mechanical connections, where said pin of said main fitting is arranged orthogonal to each pin of said additional fittings;
wherein the load reacting device further includes an intermediate balance beam fitting that mechanically connects the balance beam to the main fitting, the pin orthogonal to the force transmission mid-plane passing through the intermediate balance beam fitting of, and two link rod intermediate fittings, each mechanically connecting the link rods to the additional fittings, and the pins orthogonal to the force transmission mid-plane passing through the link rod intermediate fittings.

2. An attachment device according to claim 1, in which the balance beam intermediate fittings and link rod intermediate fittings include forks that hold parts that protrude from the main fittings and additional fittings, wherein the pins are introduced into bores made in the forks and the protruding parts.

3. An attachment device according to claim 1, in which the play in the mechanical connection between the link rods and the additional fittings is made at the connection between the rear ends of the link rods and the link rod intermediate fittings.

4. An attachment device according to claim 1, in which each link rod is mechanically connected to the balance beam by a pin and each link rod is mechanically connected to a link rod intermediate fitting by the same pin.

5. An attachment device according to claim 1, in which the balance beam intermediate fitting is clamped on the main fitting and each link rod intermediate fitting is clamped on the additional fitting to which each respective link rod is mechanically connected.

6. An attachment device according to claim 1, including a forward engine attachment member and a rear engine attachment member, wherein the load reacting device is arranged forward of the rear engine attachment member.

7. An engine assembly comprising:
an engine; and
an engine attachment device that includes a rigid structure and means for attachment of the engine to the rigid structure, the means for attachment including a load reacting device for thrust generated by the engine, the load reacting device including two link rods mechanically connected to a balance beam at a rear that is fixed to the rigid structure to which the balance beam is mechanically connected, two additional fittings fixed to the rigid structure to which the link rods are mechanically connected with play, in which mechanical connections between the balance beam and a main fitting and between the link rods and the additional fittings each include a pin orthogonal to a force transmission mid-plane, and the pin for each of the mechanical connections is an insertion pin for each of the mechanical connections,
wherein the load reacting device further includes an intermediate balance beam fitting that mechanically connects the balance beam to the main fitting, the pin orthogonal to the force transmission mid-plane passing through the intermediate fitting of the balance beam, and two link rod intermediate fittings, each mechanically connecting the link rods to the additional fittings, and the pins orthogonal to the force transmission mid-plane passing through the link rod intermediate fittings.

8. An aircraft comprising at least one engine assembly according to claim 7, assembled onto a wing or onto a rear part of the fuselage of the aircraft.

9. A method for mounting an aircraft engine with an attachment device including a rigid structure and means for attachment of the engine to the rigid structure, the means for attachment including a load reacting device for thrust generated by the engine, the load reacting device including two link rods mechanically connected to a balance beam at a rear that is fixed to the rigid structure to which the balance beam is mechanically connected, two additional fittings fixed to the rigid structure to which the link rods are mechanically connected with play, in which mechanical connections between the balance beam and a main fitting and between the link rods and the additional fittings each include a pin orthogonal to a force transmission mid-plane, and the pin for each of the mechanical connections is an insertion pin for each of the mechanical connections, the load reacting device further including an intermediate balance beam fitting that mechanically connects the balance beam to the main fitting, the pin orthogonal to the force transmission mid-plane passing through the intermediate fitting of the balance beam, and two link rod intermediate fittings, each mechanically connecting the link rods to the additional fittings, and the pins orthogonal to the force transmission mid-plane passing through the link rod intermediate fittings, the method comprising:
a) vertical hoisting of the engine towards the rigid structure;
b) alignment of the fittings fixed to the rigid structure and of the fittings firmly attached to the engine; and
c) realization of mechanical connections between the fittings fixed to the rigid structure and the fittings that are mechanically connected to the engine by lateral pinning of the fittings.

* * * * *